Patented June 17, 1924.

1,498,229

UNITED STATES PATENT OFFICE.

HYYM E. BUC, OF ROSELLE, NEW JERSEY, ASSIGNOR TO STANDARD DEVELOPMENT COMPANY, A CORPORATION OF DELAWARE.

PURIFYING AND DEODORIZING ISOPROPYL ALCOHOL.

No Drawing.   Application filed January 18, 1923.  Serial No. 613,318.

*To all whom it may concern:*

Be it known that I, HYYM E. BUC, a citizen of the United States, residing at Roselle, in the county of Union and State of New Jersey, have invented a new and useful Improvement in Purifying and Deodorizing Isopropyl Alcohol, of which the following is a specification.

The present invention relates to the deodorization and purification of isopropyl alcohol, and particularly of the isopropyl alcohol derived from hydrocarbon materials containing olefines, such as the gases of oil refineries in which oil cracking operations forming propylene are carried out. Such propylene has a persistent foreign odor, the origin of which is not definitely known, but which is believed to be due to minute proportions of sulfur compounds, of unknown and obscure character.

In accordance with the present invention, the isopropyl alcohol is treated with a hypochlorite, such as sodium hypochlorite or calcium hypochlorite, the proportion of hypochlorite employed being such that its equivalent in free halogen bears a proportion to the amount of alcohol in the order of 0.5 to 2.5%. In general, it is preferred that the treatment with the hypochlorite take place in the presence of a free alkali, any soluble alkali being suitable for this purpose. In carrying out the invention, the alcohol is mixed with a solution containing a suitable quantity of the hypochlorite, dissolved or in suspension, and also containing free alkali, such as sodium hydroxide, if alkali is to be used. The mixture is allowed to stand for a period of one-half hour or longer, and the alcohol is then distilled off. The treatment is found to be effective in removing the odor and effecting the purification of crude isopropyl alcohol, as well as the more refined grades of isopropyl alcohol containing .005 to .05% of sulfur.

The invention is illustrated by the following specific example:

About 1000 volume parts of alcohol are treated with 50 to 100 parts of a solution containing approximately 5% of sodium hypochlorite and 10 to 15% of sodium hydroxide. The mixture is agitated and allowed to stand for one-half to one hour and the alcohol is distilled off.

I claim—

1. The method of deodorizing isopropyl alcohol produced from hydrocarbon material which comprises treating it with a hypochlorite.

2. The method of deodorizing isopropyl alcohol produced from hydrocarbon material which comprises treating it with a hypochlorite and an alkali.

3. The method of purifying and deodorizing isopropyl alcohol derived from hydrocarbon material which comprises adding to the isopropyl alcohol an alkaline solution of sodium hypochlorite.

4. The method of purifying and deodorizing isopropyl alcohol derived from hydrocarbon material which comprises adding to the alcohol an alkaline solution of sodium hypochlorite and distilling off the alcohol.

5. The method of purifying and deodorizing isopropyl alcohol derived from hydrocarbon material which consists in admixing with 1000 volume parts of alcohol from 50 to 100 parts of a solution containing about 5% of sodium hypochlorite and 10 to 15% of sodium hydroxide.

HYYM E. BUC.